Dec. 2, 1969   T. M. SULLIVAN   3,481,421
OSCILLATING DRIVE AXLE AND LUBRICATION THEREFOR
Filed March 27, 1968   3 Sheets-Sheet 1
FIG. 1
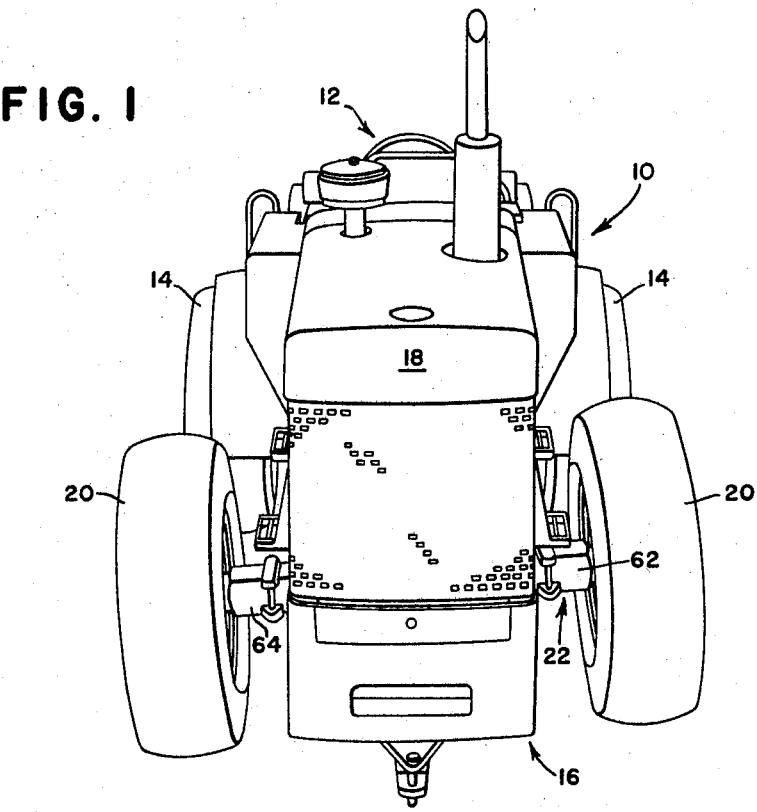
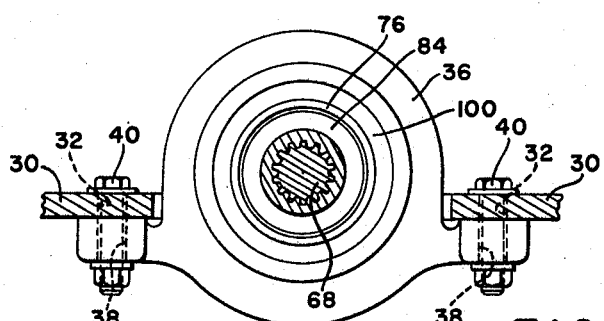
FIG. 4
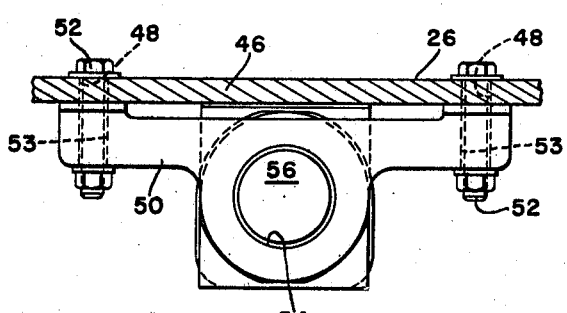
FIG. 5
INVENTOR.
T. M. SULLIVAN

INVENTOR.
T. M. SULLIVAN

`United States Patent Office`

3,481,421
Patented Dec. 2, 1969

3,481,421
OSCILLATING DRIVE AXLE AND
LUBRICATION THEREFOR
Thomas Milo Sullivan, Cedar Falls, Iowa, assignor to
Deere & Company, Moline, Ill., a corporation of
Delaware
Filed Mar. 27, 1968, Ser. No. 716,550
Int. Cl. B60k 17/34
U.S. Cl. 180—75                             9 Claims

ABSTRACT OF THE DISCLOSURE

An articulated four-wheel drive loader having a rearward engine-supporting frame supported on an oscillating drive axle assembly which swings about a fore-and-aft axis coaxial with the drive shaft. The axle assembly includes a differential housing from which opposite axle housings extend, the differential housing being mounted on coaxial front and rear journal bearings carried by the frame, both of said bearings being in fluid communication with the interior of the differential housing and lubricated by the oil therein.

BACKGROUND OF THE INVENTION

This invention relates to an oscillating drive axle for an industrial tractor or the like, and more particularly to improve bearings for mounting the axle on the tractor frame and improved means for lubricating the bearings.

It is known to provide an oscillating drive axle structure for relatively large off-the-road wheeled vehicles, such as four-wheel drive loaders or the like, so that all four drive wheels will stay in contact with the ground, regardless of the unevenness of the terrain. It is further known to mount the entire axle structure, including the differential housing, on a pair of bearings carried by the frame and disposed in fore-and-aft alignment on the front and rear sides of the differential housing, the axle structure oscillating about the fore-and-aft axis of the bearings.

Of course, lubrication for such bearings is important. However, since the bearings are located underneath the vehicle, access to the bearings has presented a problem, especially since such vehicles are large and relatively heavy and therefore difficult to raise for access to the underside of the vehicle, and also since such vehicles are generally stored proximate to the location of their use, which generally means that they are stored in a terrain which would discourage those responsible for their maintenance from crawling under the vehicle to lubricate the bearings. Thus, in many cases, the bearings do not receive adequate lubrication.

SUMMARY OF THE INVENTION

According to the present invention, improved means are provided for lubricating the oscillating axle bearings. More specifically, means are provided for automatically lubricating said bearings by utilizing the oil within the differential housing.

Another feature of the invention resides in the fact that oil is supplied to the bearings, even though the level of oil in the differential housing is below the bearings.

Still another feature of the invention resides in the fact that at least one of the bearings or seals associated therewith may be replaced without draining the differential housing.

Also according to the present invention, a novel arrangement of components is provided for pivotally mounting the axle structure, the arrangement being compact, rugged, and economical, and further being simple to disassemble for maintenance purposes, in some instances, without draining the differential housing.

BRIEF DESCRIPTION OF THE DRAWINGS

FIG. 1 is a top rear perspective of an articulated four-wheel drive loader, in which the invention is embodied, the oscillating rear axle structure of the loader being slightly rotated relative to the remainder of the machine.

FIG. 4 is a front end view of the front bearing on which the oscillating axle structure is mounted.

FIG. 5 is a rear end view of the rear bearing on which the oscillating axle structure is mounted.

DESCRIPTION OF THE PREFERRED EMBODIMENT

Figure 2:
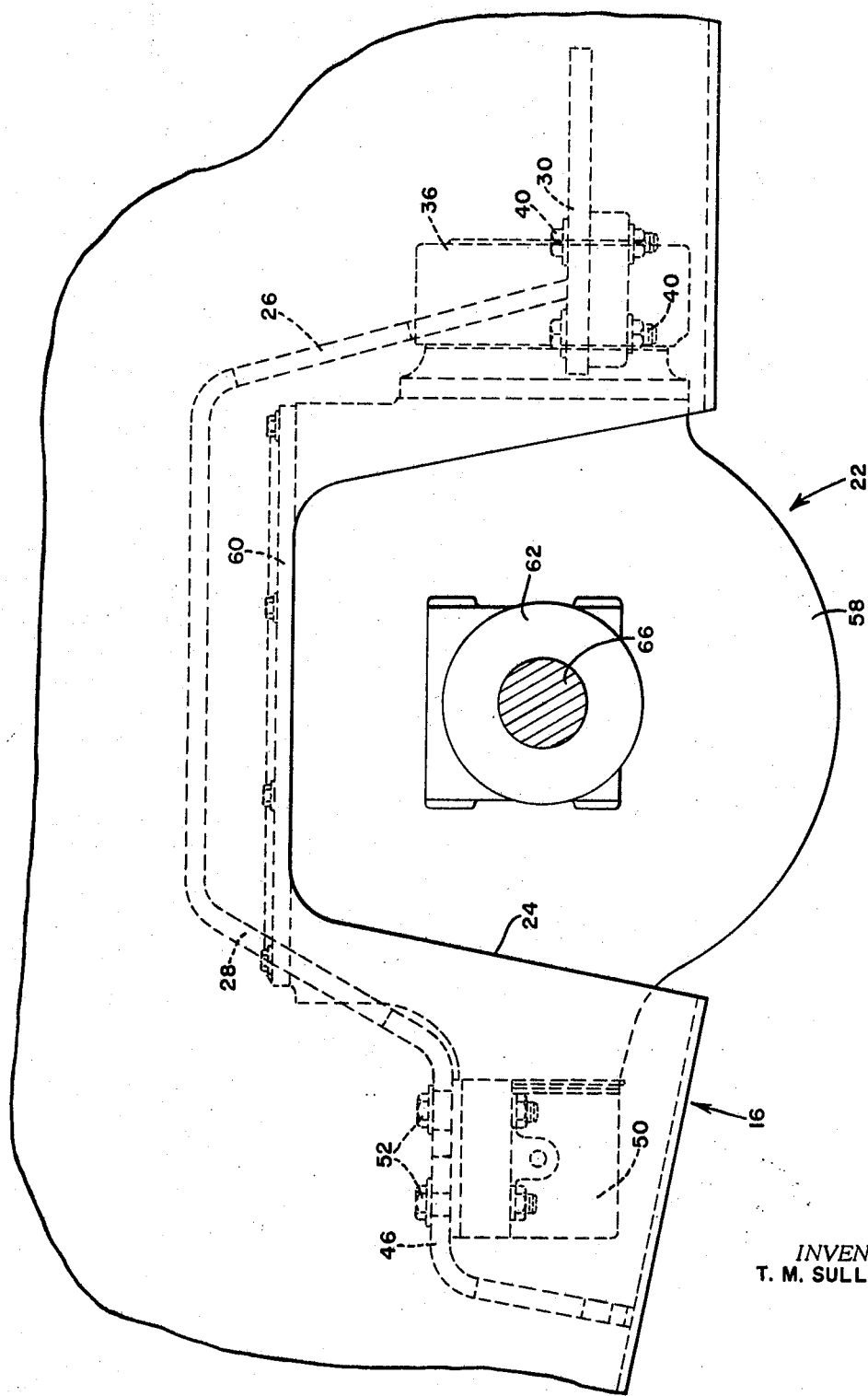
FIG. 2 is a side elevation view of the lower portion of the rear frame of the loader, the right rear wheel of the vehicle being removed, and the axle being shown in section.

The invention is embodied in an articulated loader, which is shown in its entirety in FIG. 1. The loader has an articulated main frame, indicated generally by the numeral 10, including a front frame portion 12 on which a conventional loader (not shown) is mounted. The front frame portion 12 is supported on a pair of driven front wheels 14 and is pivotally connected to a rear frame portion, indicated generally by the numeral 16, through a pair of vertically aligned pivots (not shown). The rear frame portion 16 supports a conventional internal-combustion engine, mounted within an engine enclosure 18, and is supported on a pair of rear drive wheels 20 through an oscillating axle structure, indicated generally by the numeral 22, the axle structure 22 being swingable to a limited degree about a central fore-and-aft axis, so that the front and rear drive wheels 14 and 20 can follow the contour of the ground, even on relatively rough terrain.

The rear or engine-supporting frame portion 16 is a relatively large rigid structure, elongated in a fore-and-aft direction and having a generally U-shaped transverse cross section, the engine being cradled between the upright side walls of the frame. The oscillating axle structure is disposed in a laterally extending opening 24, which extends the width of the rear frame portion, the intersection of the opening 24 with the opposite sides of the rear frame portion forming a generally inverted U-shaped edge. The upper or horizontal portion of the opening is sufficiently elevated to permit limited oscillation of the axle structure 22.

The rear frame also includes a relatively strong axle support member 26, which has a generally inverted U-shaped fore-and-aft cross section and extends between the opposite sides of the rear frame portion, the support member 26 having approximately the same configuration as and surrounding the opening 24. The support member has a large, central top opening 28 above the central portion of the axle structure 22, the upper portion of which projects into the opening as the axle structure oscillates. The lower forward edge of the support member 26 is welded to a pair of generally horizontal front support plates 30, which are also welded to and extend inwardly from the opposite upright sides of the rear frame portion. The inner ends of the support plates 30 are spaced apart and each plate 30 has a pair of upright bores adjacent its inner end. As best seen in FIG. 4, a front support bracket 36 is disposed between the inner ends of the front support plates 30. The bracket 36 has a pair of vertical bores 38 at its opposite lateral sides, the bores 38 being aligned with the respective bores 32 in the support plates 30. The bracket is rigidly bolted to the front support plates 30 by four bolts 40 extending through the aligned bores in the bracket and the support plates. The front support bracket 36 also has a central, fore-and-aft extending axial bore 42 having an enlarged portion 44 at its rearward end.

The rearward portion of the axle support member 26 has a step formed by a generally horizontal portion 46, the bottom edge of the rearward leg of the support member 26 being welded to the bottom of the rear frame portion. The horizontal portion 46 is provided with four upright bores 48, and a rear support bracket 50 is rigidly connected to and depends from the horizontal portion 46 by four bolts 52 extending through the bores 48 and bores 53 aligned therewith and extending through the rear support bracket 50. The rear support bracket 50 also has a central fore-and-aft extending bore 54, which is aligned with the bore 42 in the front support bracket and carries a cylindrical, forwardly extending pin 56.

Figure 3:
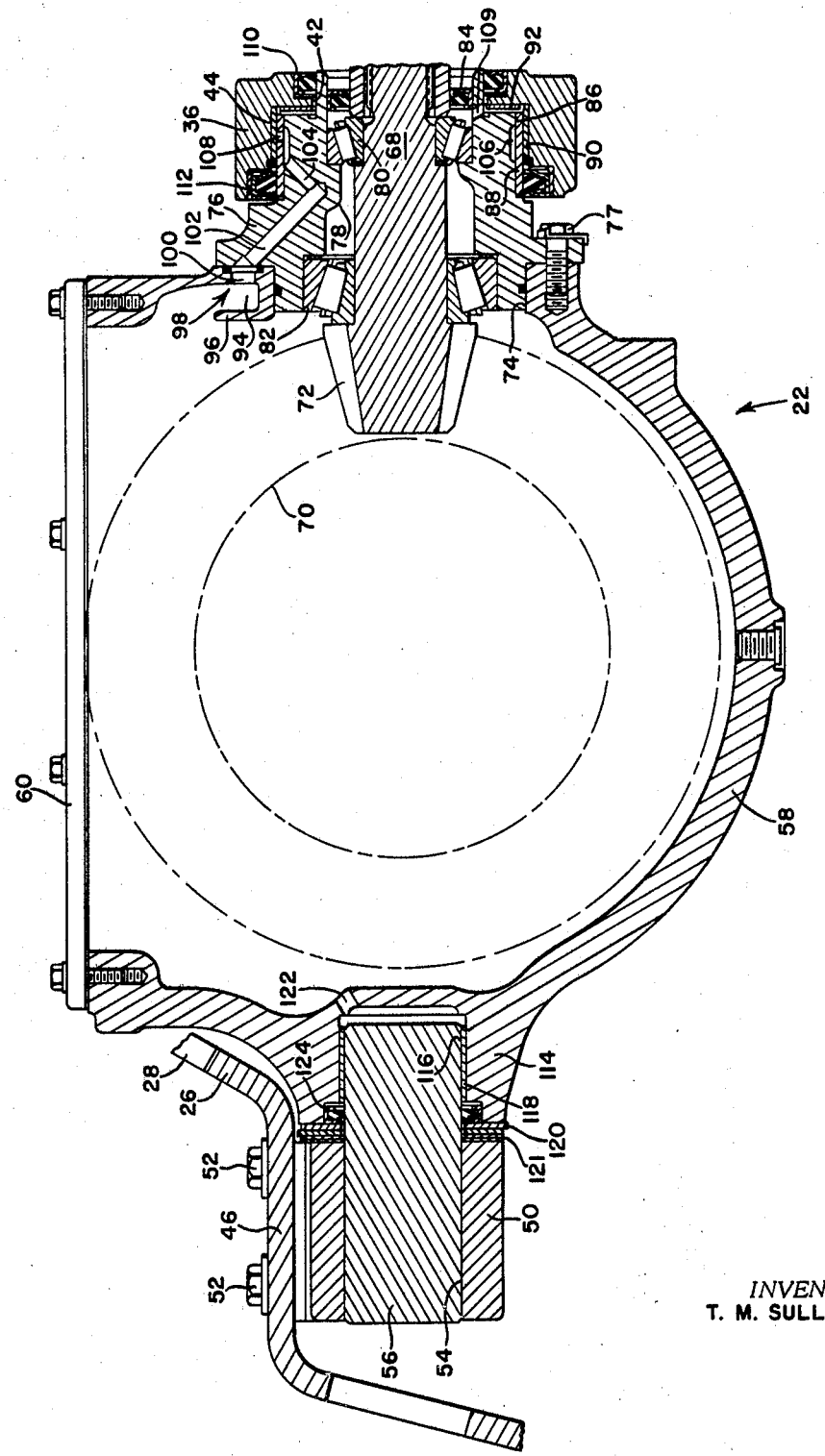
FIG. 3 is a fore-and-aft section through the axis of oscillation of the rear axle structure, as viewed in the same direction as FIG. 2, but on a slightly larger scale than FIG. 2.

The oscillating axle structure 22 includes a central, hollow, approximately spherical differential housing or casing 58 having a flat top formed by a top or cover plate 60. Right and left axle housings 62 and 64, of conventional construction, project laterally in opposite directions from the opposite sides of the differential housing 58, the axle housings enclosing conventional axles 66, which drive the rear wheels 20. The axles 66 are driven by a fore-and-aft drive shaft 68, through conventional differential gearing mounted within the housing 58, only the ring gear 70 of the differential gearing being schematically shown in FIG. 3, the ring gear 70 being driven in the conventional manner by a bevel gear 72 affixed to the end of the drive shaft 68. The drive shaft is also of conventional construction, and only the rearward portion of the drive shaft is illustrated in FIG. 3, the drive shaft being driven by the engine through a power train which also drives the front wheels 14.

The front wall of the housing 58 is provided with a circular opening 74 in which an annular member 76 is coaxially mounted, the annular member being rigidly secured to the housing by a plurality of bolts 77 spaced at intervals around the opening. The annular member 76 extends forwardly from the housing and has a generally cylindrical axial bore 78 through which the drive shaft 68 coaxially extends, the drive shaft 68 being journaled in the member 76 by a pair of tapered roller bearings 80 and 82 respectively adjacent the forward and rearward ends of the axial opening 78. An oil seal 84 forwardly of the front bearing 80 prevents the leakage of oil from the differential housing interior.

The annular member is provided with a cylindrical outer bearing surface 86, which is coaxially received in the enlarged diameter portion 44 of the bore in the front support bracket 36. An inner bearing bushing 88 is coaxially mounted on the bearing surface 86 and is rotatable relative to an outer bearing bushel 90 mounted in the bore 44, the inner bushing 88 rotating within the outer bushing 90 when the axle structure oscillates. A radial thrust bearing 92 is interposed between a shoulder at the forward end of the annular member 76 and the annular surface on the bracket 36 between the smaller diameter bore 42 and the larger diameter bore 44.

A relatively small oil reservoir 94 is formed in the forward wall of the differential housing 58 above the opening 74, the reservoir being formed by an upright lip 96 spaced from the foreward wall and extending laterally across the interior of the differential housing. The reservoir 94 is connected to the surface between the bearing bushings 88 and 90 by a passage, indicated in its entirety by the numeral 98. The passage is formed by a small opening 100 in the forward wall of the differential housing, which is connected to a forwardly and downwardly inclined passage 102 in the annular member 76. The inclined passage 102 in turn is connected to an upwardly and forwardly inclined passage 104 in the same member 76, which communicates with an annular recess 106 around the bearing surface 86. A small radial hole 108 through the inner bushing 88 connects the annular recess 106 with the bearing surface between the two bushings.

An additional small radial passage 109 is provided in the annular member 76 between the axial opening 78 and the exterior of the annular member, the passage 109 providing fluid communication between the thrust bearing and the central axial opening 78 between the front oil seal 84 and the front bearing 80. A front oil seal 110, mounted in the bore 42, seals the forward end of the pivot connection between the bracket 36 and the forward end of the member 76 and a second oil seal 112 seals the pivot connection at the rearward end of the bracket 36 between the larger diameter portion 44 of the bracket and the inner bushing 88.

The rearward wall of the differential housing 58 has an integral rearwardly extending projection 114 which is provided with a cylindrical bore or socket 116 coaxial with the drive shaft 68 and the front bearing. A bearing bushing 118 is mounted in the socket 116 and journals the forward end of the pin 56 to swingably support the rearward end of the oscillating axle structure. A pair of thrust washers 120 are provided between the rearward radial face of the projection 114 and the forward face of the bracket 50 and a sufficient number of shims 121 are provided adjacent the thrust washers to limit the axial end play of the drive axle structure between the front and rear bearings.

A space is provided between the end of the pin 56 and the bottom of the socket 116 and a downwardly and rearwardly inclined passage 122 through the rear wall of the differential housing 56 connects this space with the interior of the differential housing, so that oil from the differential housing can be utilized to lubricate the bearing bushing 118. Again, an oil seal 124 is provided at the rearward end of the bushing 118 sealing the pin to the housing.

In operation, as is apparent from the above, the differential housing, and the entire rear drive axle assembly 22 are free to oscillate about the fore-and-aft axis of the rear bearing, formed by the rotation of the pin 56 in the rear bearing bushing 118, and the forward bearing, formed by the relative rotation between the bushings 88 and 90. As is also apparent, this axis of oscillation coincides with the axis of rotation of the drive shaft 68.

As is conventional, the interior of the differential housing 58 is filled with oil at least to the center line of the drive shaft. As the ring gear 70 rotates, the oil within the differential housing is splashed around the housing interior, some of the oil finding its way through the rear passage 122 into the space between the pin and the housing 58. Since the oil cannot escape from this space except through the passage 122, and the passage 122 is substantially above the center line of the drive shaft, the passage being at substantially the same level as the top of the socket 116, all but the top of the socket is immersed in oil regardless of the oil level in the differential housing. Also, since the passage is above the normal oil level in the differential housing, the axle assembly can be removed from the pivot pin 56 for certain maintenance operations, such as replacing the rear bearing or the rear oil seal 124, without draining the differential housing.

The front bearing is also automatically lubricated by oil from the differential housing. As oil is splashed about the interior of the differential housing, it collects in the reservoir 94 from which it flows to the bearing bushings via the passage 98. Oil is maintained in the reservoir 94 up to the level of the top edge of the lips 96, regardless of the oil level in the differential housing, and since this oil level is substantially above the top of the bearing bushings, lubricating oil is always available for the bushings around their entire circumference. Oil flowing around and between the bushings 88 and 90 flows to the forward end of the enlarged diameter portion 44 and flows around the thrust bearing 92 to also lubricate the bearing 92. The oil flowing inwardly over the thrust bearing 92 is drained into the axial opening 78 in the member 76 via the passage 109, to lubricate the drive shaft bearings 80 and 82. The rear bearing 82 is a tapered roller bearing and to a small degree acts as a pump to discharge the oil in the axial opening 78 back into the differential housing 58. The slight pumping action of the bearing plus the head of the oil maintained by the height of the reservoir 94 above the bearing bushings maintains a constant supply and flow of oil through the bearing assembly.

I claim:

1. In a tractor having a frame, a generally fore-and-aft drive shaft, and a pair of laterally spaced drive wheels, the improvement comprising: a central gear housing adapted to hold lubricating fluid; a pair of axle housings rigidly mounted on and extending in opposite lateral directions from the gear housing; first bearing means journalling said drive shaft in said gear housing; a pair of axles respectively rotatable in the axle housings and drivingly connected to the respective drive wheels; gear means in the gear housing drivingly connecting the drive shaft to the axles; a front and a rear second bearing means coaxially disposed in fore-and-aft alignment on the front and rear sides of the gear housing and journalling said gear housing to the frame to permit said gear housing and axle housings mounted thereon to oscillate about the fore-an-aft axis of said second bearing means; and passage means in open communication with at least one of said second bearing means and with the gear housing interior to permit the flow of lubricating fluid from the gear housing interior to said at least one of said second bearing means.

2. The invention defined in claim 1 wherein said second bearing means are coaxial with the drive shaft, the drive shaft extending rearwardly through the front one of said second bearing means and being journaled relative thereto.

3. The invention defined in claim 2 wherein the gear housing includes an annular forwardly extending portion having an axial bore through which the drive shaft extends and the front one of said second bearing means includes a cylindrical outer surface on said forwardly extending portion, a support rigidly attached to the frame and having an axial bore adapted to coaxially and rotatably receive the forwardly extending portion, and bearing bushing means between the cylindrical surface and the support bore, the passage means including a forward passage formed in the gear housing and adapted to transmit lubricating fluid to the forward bearing bushing means.

4. The invention defined in claim 3 wherein the rear one of said second bearing means includes a forwardly extending pin connected to the frame, a rearward cylindrical bore in the gear housing adapted to coaxially and rotatably receive the pin, and a bearing bushing between the pin and rearward bore, the passage means including a rear passage through the gear housing and connecting the housing interior to the rearward bore.

5. The invention defined in claim 3 and including a relatively small reservoir formed by the gear housing in the housing interior in fluid communication therewith and adapted to hold lubricating fluid independently of the housing, the forward passage being connected to the gear housing interior through said reservoir.

6. The invention defined in claim 1 wherein the passage means includes a forward passage connecting of the front one of said second bearing means to the gear housing interior and a rear passage connecting the rear one of said second bearing means to the gear housing interior.

7. The invention defined in claim 6 wherein the front and rear passages are connected to the gear housing interior above the axis of one of said second bearing means.

8. The invention defined in claim 7 wherein the front passage includes a portion inclining downwardly from the housing interior to the front one of said second bearing means.

9. The invention defined in claim 8 and including a relatively small oil reservoir in the gear housing interior communicating with the housing interior and at least one of the passage means, and adapted to hold lubricating fluid independently of the housing.

References Cited

UNITED STATES PATENTS

| 2,183,667 | 12/1939 | Buckendale. | |
| 2,971,595 | 2/1961 | Fabere et al. | 180—49 |
| 3,029,889 | 4/1962 | Paramythioti | 180—42 |
| 3,161,250 | 12/1964 | Gardner | 180—75 X |
| 3,378,095 | 4/1968 | Sons | 180—75 |

A. HARRY LEVY, Primary Examiner

U.S. Cl. X.R.

180—51; 184—6; 280—111